No. 861,155. PATENTED JULY 23, 1907.
J. W. ACHARD.
SYSTEM OF ELECTRICAL DISTRIBUTION.
APPLICATION FILED APR. 15, 1905.
2 SHEETS—SHEET 1.
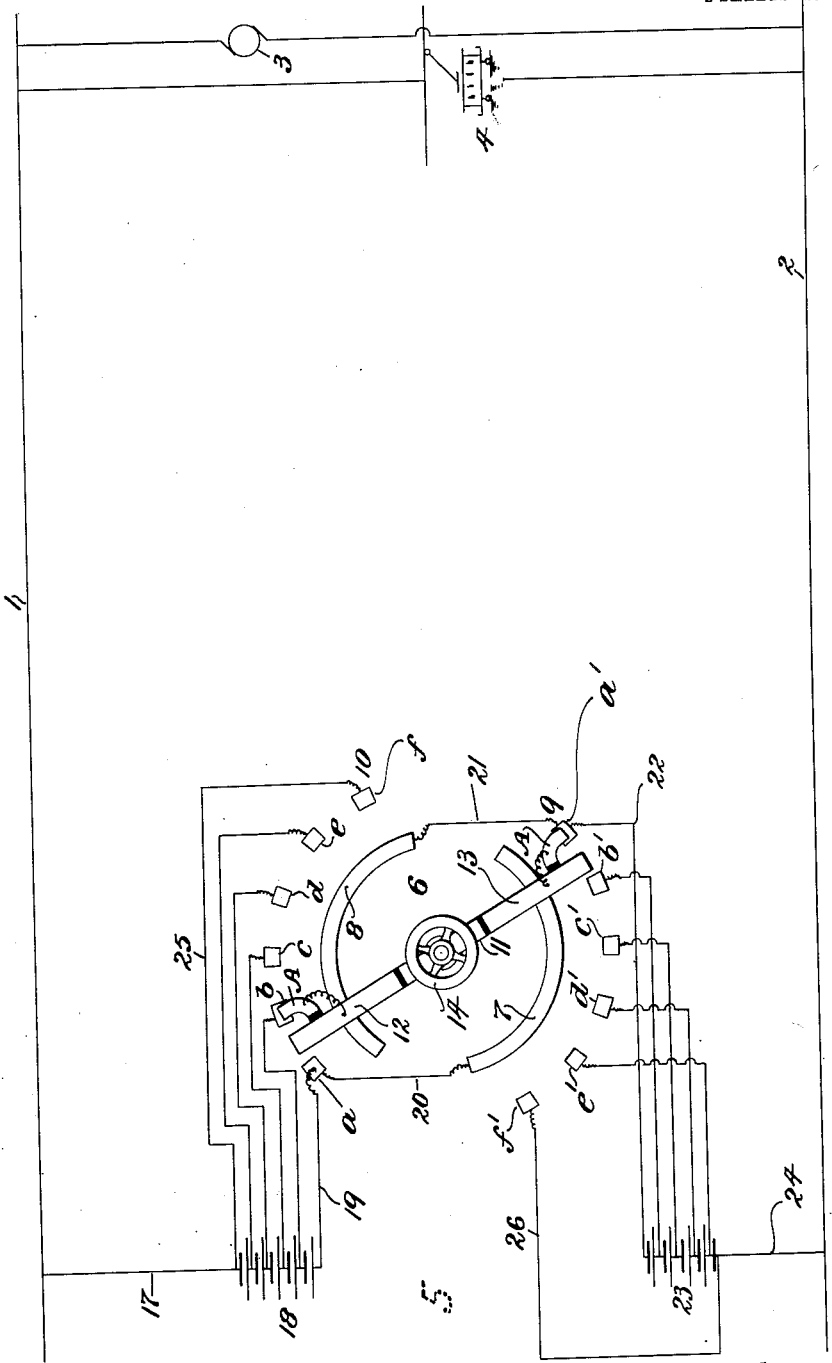

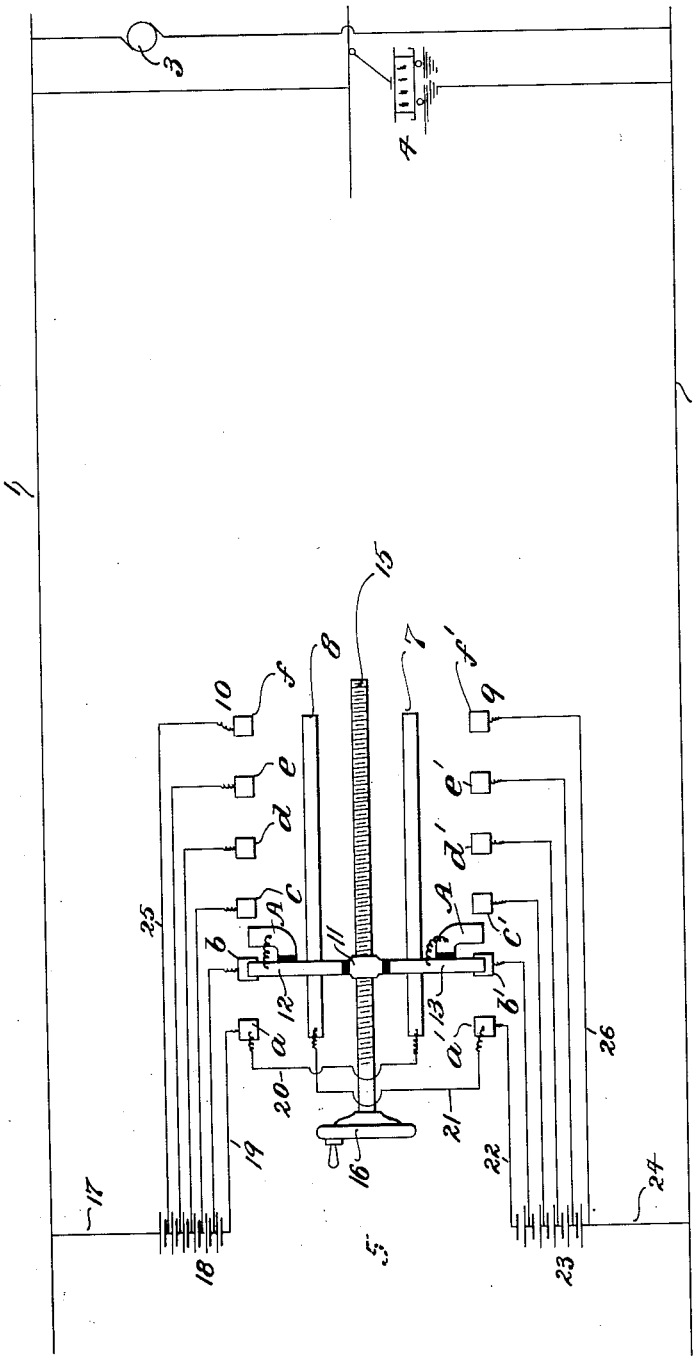

UNITED STATES PATENT OFFICE.

JOHN W. ACHARD, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

SYSTEM OF ELECTRICAL DISTRIBUTION.

No. 861,155.

Specification of Letters Patent.

Patented July 23, 1907.

Application filed April 15, 1905. Serial No. 255,795.

*To all whom it may concern:*

Be it known that I, JOHN W. ACHARD, a citizen of the United States, residing at the city of Philadelphia, in the county of Philadelphia and State of Pennsylvania, have invented a new and useful System of Electrical Distribution, of which the following is a specification.

One object of the present invention is to provide simple, durable and reliable means for keeping the floating voltage of a battery the same or substantially the same as the average voltage of the line on which it is floated.

To this and other ends hereinafter set forth the invention, stated in general terms, comprises the improvements to be presently described and finally claimed.

The nature, characteristic features and scope of my invention will be more fully understood from the following description taken in connection with the accompanying drawings forming part hereof and in which Figure 1, is a diagrammatic view illustrating a system of distribution embodying features of the invention, and Fig. 2, is a similar view illustrating a modification of the invention.

In the drawings 1 and 2, are the conductors which constitute a distribution circuit and extend from the generator 3, to a considerable distance commensurate, for example, with the length of a trolley line.

4, indicates a translating device of which there may be a number of any variety supplied from the circuit 1—2.

5, is a storage battery comprising a number of cells and connected or floated across the distribution circuit 1—2, at a distance from the generator 3; for example, it may be located out toward the end of the trolley line. Some of the cells of this battery, either singly or in groups, are adapted to be placed both in series and parallel relation to the others; for example, at times of light or heavy load the average line voltage is high or low and it is desirable that the voltage of the battery should be adjusted accordingly, and this can be advantageously accomplished by putting some of its cells, either in groups or singly, in series or parallel relation to the others.

6, designates means for arranging the cells in such relations and a description of these means will now be given.

7 and 8, are contact strips, and 9 and 10, are rows of contact points.

11, is a movable arm provided with bridge pieces 12 and 13, insulated from it and from each other. As shown in Fig. 1, the arm 11, is revoluble, for example, by means of the hand wheel 14, and the contact strips and points are arranged in the arcs of circles, whereas in Fig. 2, the contact strips and points are arranged in parallel lines and the arm 11, is movable, for example, by means of the screw 15, and the hand wheel 16. When the arm is so positioned that it rests upon the contacts $aa^1$, the path of the current is by way of 17, all of the part or section 18, of the battery, conductor 19, contact $a$, conductor 20, strip 7, bridge 13, to contact $a^1$, or from $a$, by 12, by strip 8, by conductor 21, to $a^1$, and thence by conductor 22, through the part 23, of the battery and by the conductor 24, to line. Thus it will be seen that all of the cells of the battery are connected in series relation across the line. One end of the part 18, of the battery is connected to the contact $a$, and to the strip 7, and one end of the part 23, of the battery is connected to contact $a^1$, and strip 8, and intermediate cells or groups of cells of the respective parts 18 and 23, of the battery are connected with the contact points $bb^1$, $cc^1$, etc. For the sake of description, it may be assumed that arm 11, is turned or moved so as to rest upon the contacts $f$ and $f^1$. Under these conditions the path of the current is from 17, by 25, $f$, 12, 8, 21, 22, battery 23, 24, also by 19, 20, 13, conductor 26, to 24, thus the parts 18 and 23, of the battery are in parallel so that the battery voltage would be small compared to what it would be when all the cells of the battery are in series. Obviously when the arm 11, is arranged to rest upon intermediate contacts a greater or less number of cells or groups of cells are in parallel relation while the remainder of the cells or groups of cells are in series relation.

A, are auxiliary brushes.

It will be obvious to those skilled in the art to which my invention appertains that modifications may be made in detail without departing from the spirit thereof, hence the invention is not limited further than the prior state of the art may require, but

Having thus described the nature and objects of my invention, what I claim as new and desire to secure by Letters Patent is:

The combination of a line circuit, a battery connected across the same and divided in sections, a pair of contact strips, two rows of contacts whereof one contact in each row is connected to one of said strips and to one end of a battery section and whereof the other contacts are connected with the cells or groups of cells of the battery sections, a movable arm provided with insulated bridge pieces adapted to coöperate with the strips and contacts, and means for moving the arm, substantially as described.

In testimony whereof I have hereunto signed my name.

JOHN W. ACHARD.

Witnesses:
 BRUCE FORD,
 GEO. M. HOWARD.